(12) United States Patent
Schmidt

(10) Patent No.: US 11,603,189 B2
(45) Date of Patent: Mar. 14, 2023

(54) SHAFT DRIVEN SELF-POWERED LANDING GEAR WITH FRICTION DRIVE

(71) Applicant: Safran Landing Systems Canada Inc., Ajax (CA)

(72) Inventor: Robert Kyle Schmidt, Brooklin (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 123 days.

(21) Appl. No.: 17/147,294

(22) Filed: Jan. 12, 2021

(65) Prior Publication Data

US 2022/0219812 A1   Jul. 14, 2022

(51) Int. Cl.
*B64C 25/40* (2006.01)
*B64C 25/36* (2006.01)

(52) U.S. Cl.
CPC ............ *B64C 25/405* (2013.01); *B64C 25/36* (2013.01)

(58) Field of Classification Search
CPC ....... B64C 25/405; B64C 25/36; F16H 55/54; F16H 13/08; F16H 13/10–14; B64D 2205/00
See application file for complete search history.

(56) References Cited

U.S. PATENT DOCUMENTS

| | | |
|---|---|---|
| 2,425,583 A | 8/1947 | Volk |
| 3,711,043 A | 1/1973 | Cameron-Johnson |
| 4,824,419 A | 4/1989 | Kumm |
| 6,110,093 A | 8/2000 | Slusarz |
| 9,540,097 B2 | 1/2017 | Schmidt et al. |

FOREIGN PATENT DOCUMENTS

| | | |
|---|---|---|
| CN | 107600395 A | 1/2018 |
| CN | 212267840 U | 1/2021 |

OTHER PUBLICATIONS

International Search Report and Written Opinion dated Apr. 18, 2022, issued in corresponding International Application No. PCT/CA2022/050037, filed Jan. 12, 2022, 9 pages.
Schmidt, R.K., et al., "Clutch Assembly for Autonomous Taxiing of Aircraft," U.S. Appl. No. 16/793,898, filed Feb. 18, 2020, 24 pages.

*Primary Examiner* — Richard Green
*Assistant Examiner* — Ashesh Dangol
(74) *Attorney, Agent, or Firm* — Christensen O'Connor Johnson Kindness PLLC

(57) ABSTRACT

A landing gear system includes a drive shaft extending through an axle. A wheel with a drive surface is rotatably coupled to the axle. A drive assembly, which has disengaged and engaged states, includes a drive element and an idler element. The drive element, which has an engagement feature, is coupled to the drive shaft for rotation about an axis. The engagement feature has first and second diameters when the drive assembly is in the disengaged and engaged states, respectively. The idler element is frictionally engaged with the engagement feature of the drive element to transfer rotation of the drive element to the wheel when the drive assembly is in the engaged state. The idler element is disengaged from at least one of the engagement feature of drive element and the wheel when the drive assembly is in the disengaged state.

20 Claims, 8 Drawing Sheets

SHAFT DRIVEN SELF-POWERED LANDING GEAR WITH FRICTION DRIVE

BACKGROUND

Autonomous taxiing systems provide drive capabilities to one or more wheels of an aircraft. By utilizing electric or hydraulic motors (or other power sources) to drive the wheels, operators can push back from gates and taxi without having to use their jet engines or tow tractors. As a result, fuel costs, wear and maintenance on the jet engines, and noise are all reduced.

When implementing an autonomous taxiing system, it is desirable to isolate the driven wheel from the driving mechanism when the taxiing system is not in use. Ideally, the autonomous taxi equipment does not introduce any additional rotating failure modes compared to a landing gear without the autonomous taxi equipment. For instance, with the taxiing system idle, there should be no additional rotating bearings, shafts, or other components that could fail and introduce a retarding torque during aircraft acceleration for takeoff.

U.S. Pat. No. 9,540,097, issued to Schmidt et al., ("Schmidt") and currently assigned to Safran Landing Systems, the disclosure of which is expressly incorporated herein, teaches the use of drive shafts housed within the landing gear axle to drive the aircraft wheels. Schmidt generally explains that the drive shafts may be provided with couplers for selectively coupling or uncoupling the drive shafts from the wheels. When the couplers are uncoupled, untimely powering of the motors does not rotate the wheels and does not cause a reaction torque to be applied to the undercarriage if the brakes are engaged.

Autonomous taxiing systems require high torque output to the driven wheels in order to taxi the aircraft. Motors designed to deliver such torques are typically undesirable as being too large and too heavy for use on aircraft. Compact, lightweight motors suitable for use on aircraft tend to have high-speed/low-torque outputs that lack the power needed to drive the aircraft wheels.

SUMMARY

In accordance with an embodiment of the present disclosure, a landing gear system is provided. The landing gear system includes an axle comprising an internal cavity and a wheel rotatably coupled to the axle, wherein the wheel includes a drive surface. A drive shaft is disposed within the cavity and rotatable about an axis. A drive assembly has a disengaged state and an engaged state, wherein the drive assembly comprises a drive element and an idler element. The drive element is coupled to the drive shaft for rotation about the axis and includes an engagement feature. The engagement feature has a first diameter when the drive assembly is in the disengaged state and a second diameter when the drive assembly is in the engaged state. The idler element is mounted for rotation about a second axis and frictionally engages the engagement feature of the drive element to transfer rotation of the drive element to the wheel when the drive assembly is in the engaged state. The idler element is disengaged from at least one of the engagement feature of drive element and the wheel when the drive assembly is in the disengaged state.

In any embodiment, the drive surface forms a portion of a rim of the wheel.

In any embodiment, the idler element is rotatably mounted to an idler support, the idler support positioning the idler element in a first position when the drive assembly is in the engaged state and in a second position when the drive assembly is in the disengaged state.

In any embodiment, the idler support is rotationally mounted to an idler support base, the idler support base being fixedly positioned relative to the axle.

In any embodiment, the drive assembly further comprises a biasing element engaging the idler support and the idler support base, wherein the biasing element urges the idler element toward the second position.

In any embodiment, the drive element comprises a variable-diameter roller.

In any embodiment, the idler element comprises a roller comprising a polymeric material.

In any embodiment, the idler element comprises a roller having a hardness less than a hardness of the drive element.

In any embodiment, the drive element comprises a variable-diameter pulley.

In any embodiment, the engagement feature forms a V-shaped groove with a selectively variable width.

In any embodiment, the idler element comprises a roller configured to be received by the V-shaped groove.

In any embodiment, the drive surface forms a V-shaped groove configured to receive the idler element.

In any embodiment, the variable-diameter pulley comprises a first disk mounted coaxially with a second disc about the axis, the first disk and the second disk defining at least part of the V-shaped groove.

In any embodiment, the first disk is fixed in translation along the axis relative to the axle, and the second disk is movable in translation along the axis relative to the first disk.

In any embodiment, the landing gear system further comprises an actuator configured to selectively translate the second disk along the axis.

In any embodiment, the drive system further comprises a third disk mounted coaxially with the first disk, the third disk and the first disk defining at least a part of a second V-shaped groove.

In any embodiment, the third disk is movable in translation along the axis relative to the first disk.

In any embodiment, the landing gear system further comprises a second actuator configured to selectively translate the third disk along the axis.

In any embodiment, the idler element further comprising a second roller rotatably mounted to the idler support.

In any embodiment, the drive surface further comprises a second V-shaped groove configured to receive the second roller.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of an autonomous taxiing system for an aircraft are set forth below according to technologies and methodologies of the present disclosure. In an embodiment, a drive shaft located within the axle is rotated by a motor mounted to the landing gear. A wheel is mounted to the axle and includes a drive surface. The drive shaft actuates a drive assembly that includes a variable-diameter drive element surrounded by one or more idler elements. When the drive assembly is in a disengaged state, the drive element has a smaller diameter, and the one or more idler elements are disengaged from at least one of the drive elements and the drive surface of the wheel. When the drive assembly is in an engaged state, the drive element has a larger diameter that drives the at least one idler element into the drive surface of the wheel. In this engaged state, frictional contact transfers rotation of the drive element to the wheel through the one or more idler elements.

Figure 1:
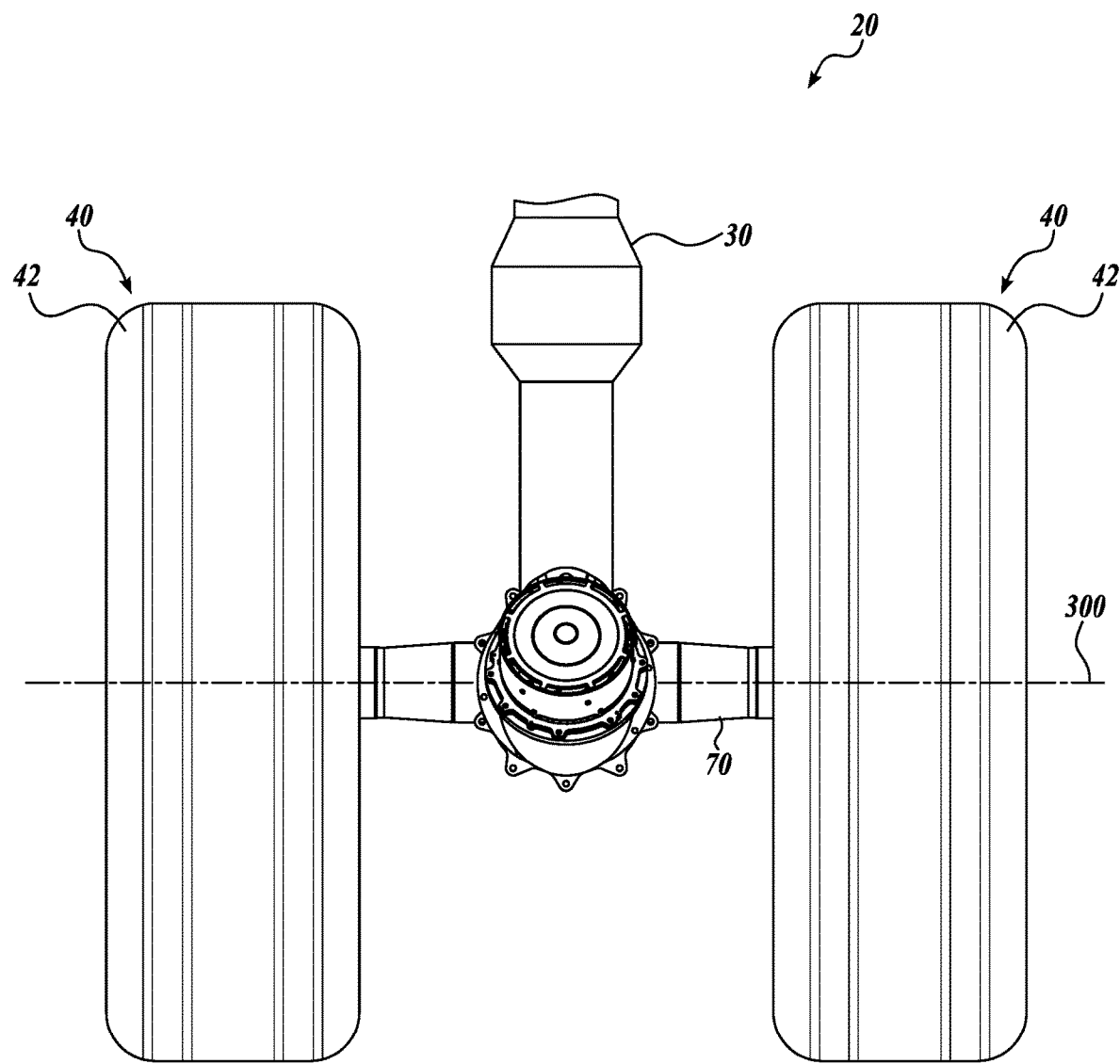
FIG. 1 shows a rear view of a landing gear system for an autonomous taxiing aircraft according to a first representative embodiment of the present disclosure.
Figure 2:
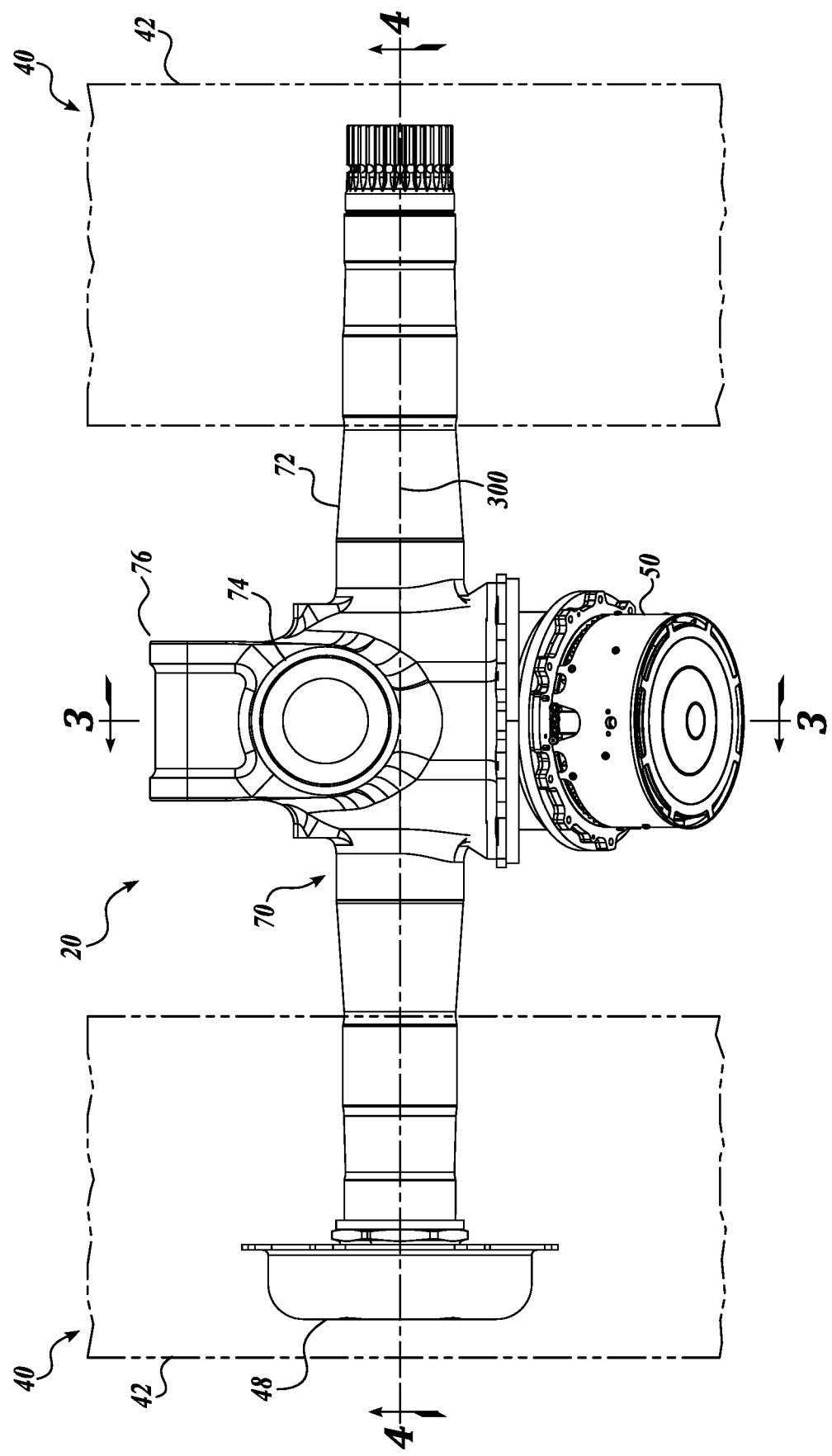
FIG. 2 shows a partial top plan view thereof.

Referring to FIGS. 1-5, a first representative embodiment of a landing gear system 20 according to the present disclosure is shown. As best shown in FIGS. 1 and 2, the landing gear system 20 includes a strut 30 and an axle assembly 70. One end of the strut 30 is coupled to the aircraft (not shown) and the other end of the strut is coupled to the axle assembly 70 at a strut interface 104 formed in an axle housing 72, as shown in FIG. 2. In the illustrated embodiment, the axle assembly 70 extends laterally outward from the strut 30 and has a wheel 40 rotatably mounted to each end. A motor 50 is mounted to a rear side of the axle housing 72. As explained in further detail, the motor 50 provides the driving force to rotate one or more of the wheels 40 to taxi the aircraft.

Figure 4:
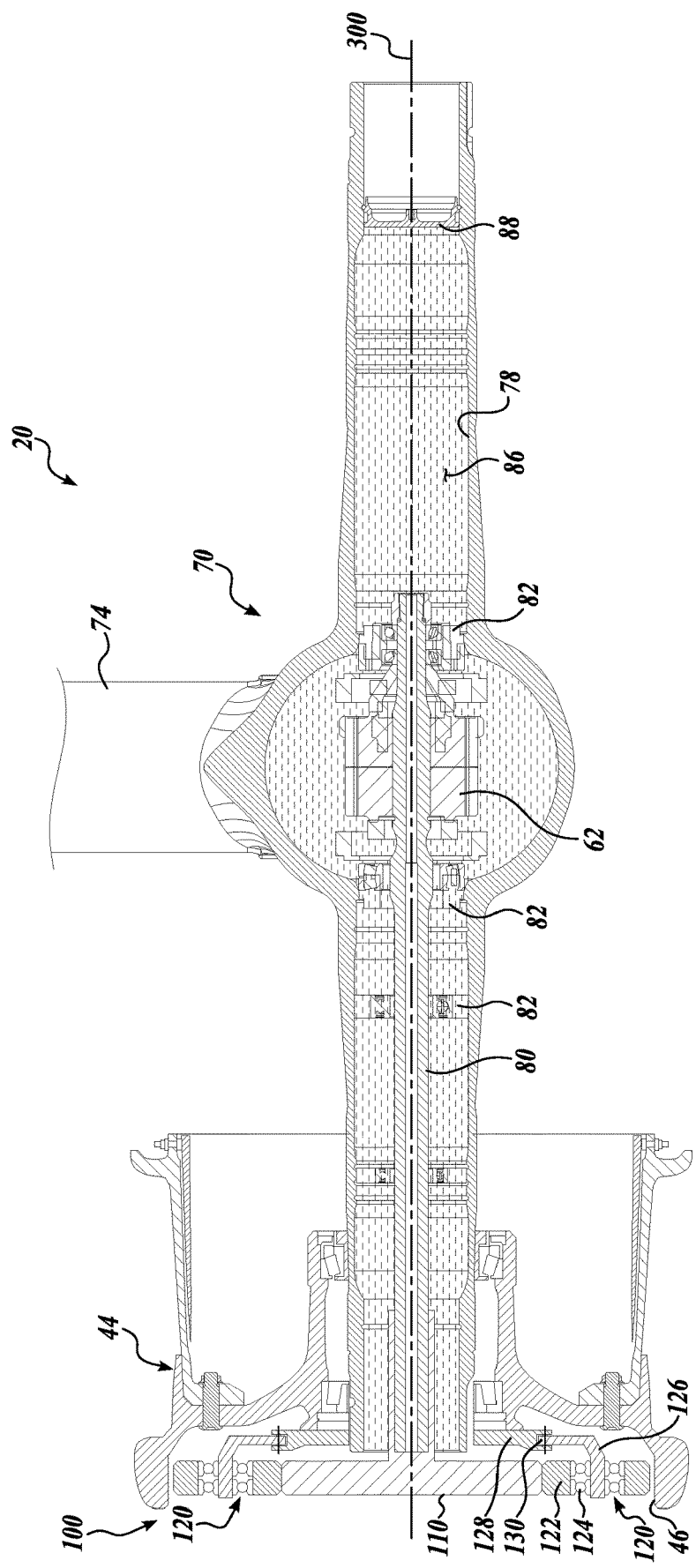
FIG. 4 shows a partial cross-sectional view of the landing gear system of FIG. 1, as indicated in FIG. 2.

Each wheel 40 includes a tire 42 mounted to a rim 46 (shown in FIG. 4). At least one of the wheels 40 includes a hub 48. A torque link lug 76 is formed on a forward end of the axle assembly 70 to provide attachment for the lower torque link of a torque link assembly (not shown), which is commonly used in known landing gear configurations.

The illustrated landing gear system 20 is a configuration similar to known main landing gear assemblies used on commercial aircraft. It will be appreciated, however, that the present disclosure is not limited to the illustrated landing gear system. In this regard, embodiments of the disclosed autonomous taxiing system can be utilized with various landing gear systems for different aircraft. In one embodiment the taxiing system is utilized with main landing gear assemblies mounted to the aircraft body or wings. In other contemplated embodiments, the taxiing system drives one or more wheels of a multi-wheel, e.g., four, six, eight, etc., landing gear system with a bogie beam. In yet another embodiment the taxiing system is used in conjunction with a single-wheel landing gear system. Embodiments are also contemplated in which the motor 50 is positioned forward of the axle assembly 70 or in another suitable location, and/or the torque link assembly is positioned aft of the axle assembly.

Figure 3:
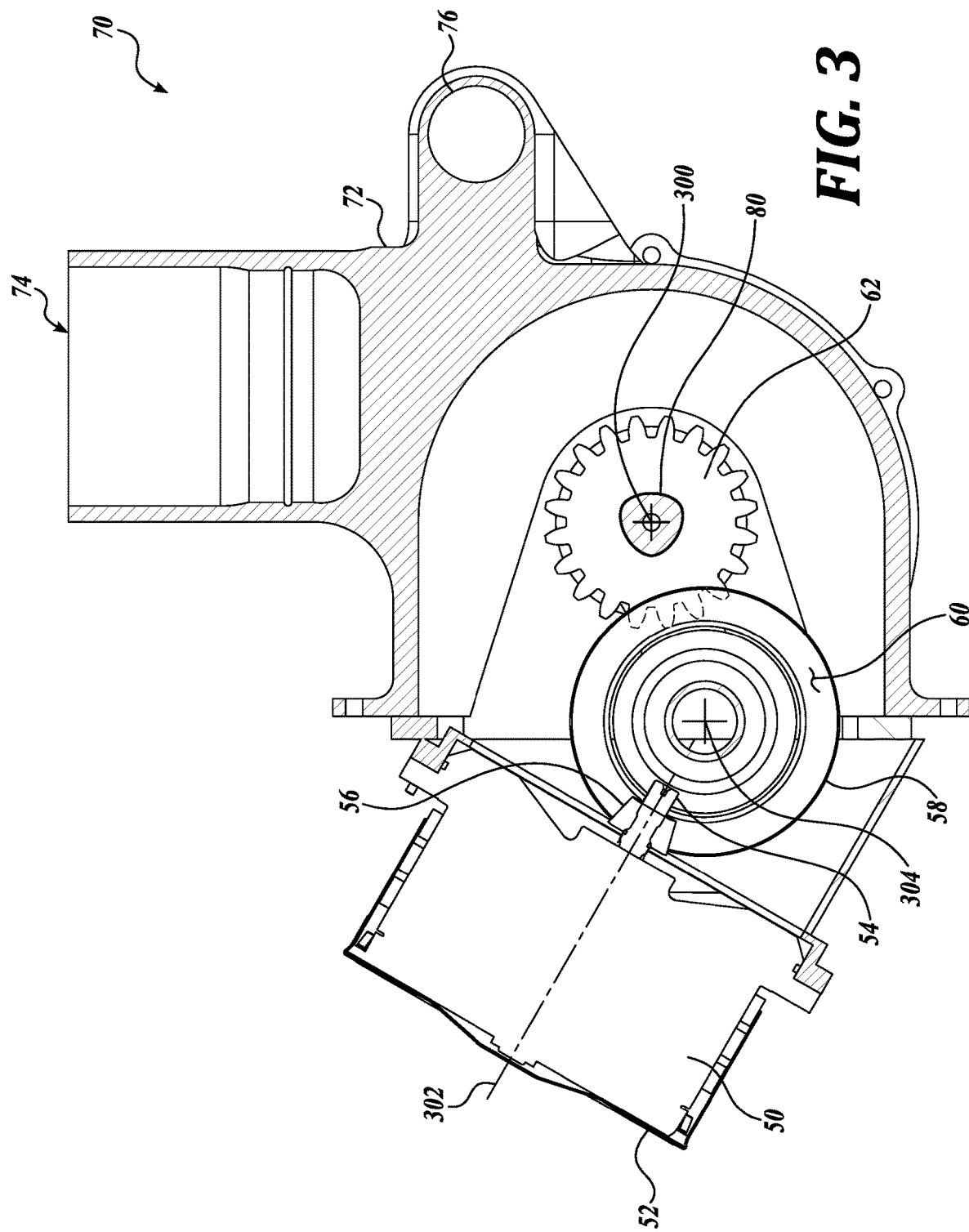
FIG. 3 shows a partial cross-sectional view of the landing gear system of FIG. 1, as indicated in FIG. 2.

Referring now to FIG. 3, which is a cross-sectional view of the system 20 taken along line 3-3 in FIG. 2, the motor 50 includes a housing 52 coupled to an aft side of the axle housing 72 by mechanical fasteners or other suitable means. The motor 50, which may be electric, hydraulic, or any other suitable type of motor, includes an output shaft 54 that selectively rotates about an axis 302. A bevel gear 56 is mounted to the output shaft 54 and engages teeth of a face 60 of an intermediate gear 58. The intermediate gear 50 is mounted for rotation about an axis 304 and engages a drive shaft gear 62. The drive shaft gear 62 is rotatably mounted within the axle housing 72 and engages a drive shaft 80 so that the rotation of the output shaft 54 of the motor 50 rotates the drive shaft gear 62 and the drive shaft 80 about a common axis 300.

In the illustrated embodiment, the portion of the drive shaft 80 that engages the drive shaft gear 62 has three lobes and nests within a similarly-shaped aperture in the drive shaft gear. In other contemplated embodiments, the drive shaft 80 may be mechanically fastened to or integrally formed with the drive shaft gear 62. Additional configurations may use different numbers and sizes of gears or other transmission elements to transform the output of the motor 50 into rotation of the drive shaft 80 about the axis 300.

FIG. 4 is a partial cross-sectional rear view taken along line 4-4 of FIG. 2, the landing gear system 20 is shown with portions of the wheels 40 removed for clarity. The axle housing 72 includes an elongate internal cavity 78. The drive shaft 80 is mounted within the cavity 78 via a plurality of bearings 82 to be rotatable about axis 300. In the illustrated embodiment, the cavity 78 is sealed at one end by a plug 88 mounted within the axle housing 72. The cavity 78 is fluid tight and filled with a fluid 86. In the illustrated embodiment, the fluid 86 is a lubricating oil that lubricates the internal components of the axle assembly 70.

Figure 5:
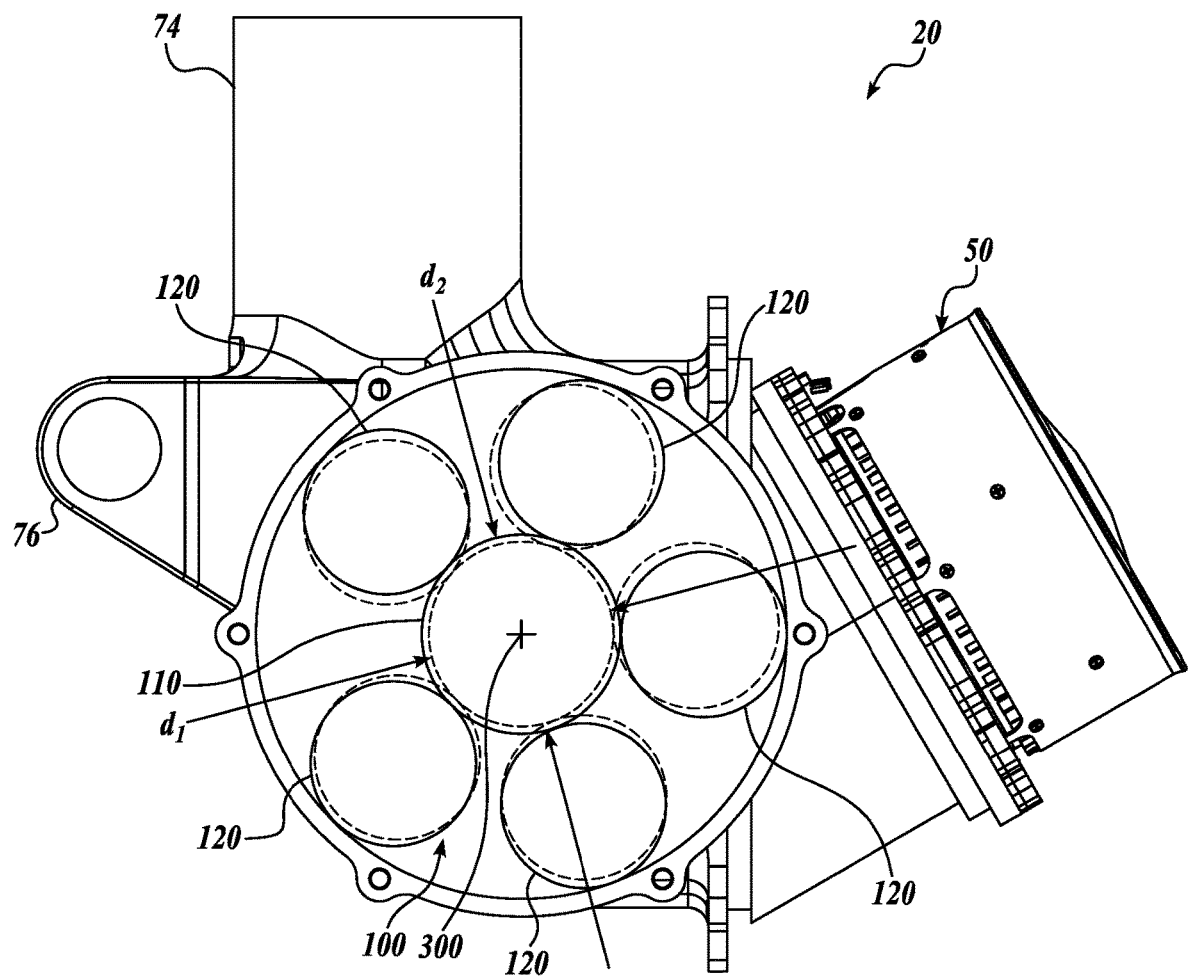
FIG. 5 shows a partial left side elevational view of the landing gear system of FIG. 1.

Referring now to FIGS. 4 and 5, a drive assembly 100 is positioned at one end of the axle assembly 70. A first end of the drive shaft 80 is operably connected to the motor 50 to receive rotational input, and a second end of the drive shaft 80 is operably connected to the drive assembly 100. The drive shaft 80 is configured to transfer rotational movement from the motor 50 to the drive assembly 100.

The drive assembly 100 includes a drive element 110 operably coupled to the drive shaft 80 such that rotation of the drive shaft rotates the drive element about axis 300. In the illustrated embodiment, the drive element 110 is a roller with a variable diameter. The drive element 110 is selectively variable between a first state, in which the drive element has a first diameter (d1), and a second state, in which the drive element has a second diameter (d2) that is larger than the first diameter. As will be explained in further detail, when the drive element 110 is in the first state, the drive assembly 100 is in a disengaged state, and when the drive element is in a second state, the drive assembly is in an engaged state.

Different configurations of variable-diameter rollers are known and may be used with the disclosed drive assembly 100. In one representative embodiment, an exterior surface of the drive element 110 is configured similar to the belt engaging elements of the pulley assembly disclosed in U.S. Pat. No. 4,824,419, issued to Kumm, the disclosure of which is incorporated by reference herein. In another embodiment, an exterior surface of the drive element 110 is configured similar to a roller disclosed in U.S. Pat. No. 6,110,093, issued to Slusarz, the disclosure of which is incorporated by reference herein. Variable-diameter drive elements are also known for use with continuously variable transmissions. These and other suitable drive elements and/or rollers configured to provide variable outer diameters for transmitting force are known and should be considered within the scope of the present disclosure.

A plurality of idler elements 120 is positioned circumferentially around the drive element 110. As shown in FIG. 5, the illustrated drive assembly 100 includes five (5) idler elements 110, however, it will be appreciated that the illustrated embodiment is exemplary only. Other embodiments may include more or fewer idler elements 110 Further, embodiments in which the idler elements are not evenly spaced around the drive element are possible. In this regard, configurations having any suitable number of idler elements arranged in any suitable manner may be utilized, and such configurations should be considered within the scope of the present disclosure.

In some embodiments, the idler elements 120 are similarly configured. An exemplary embodiment of a disclosed idler element 120 will be described below with the understanding that the other idler elements may be similarly configured. The idler element 120 includes a roller 122 rotatably mounted to an idler support 126 by one or more bearings 124. The idler support 126 is rotatably mounted to an idler support base 128 that is fixedly positioned relative to the axle 70. A biasing element 130 engages the idler support 126 to urge the roller 120 toward the drive element 110.

In some embodiments, the biasing element 130 is a torsion spring. In some embodiments, the biasing element is a tension spring or a compression spring. In some embodiments, the idler support 126 and/or the idler support base 128 are preloaded to act as a biasing element to urge the roller 120 toward the drive element 110. In some embodiments, the idler support 126 and idler support base 128 are integrally formed and cooperate to urge the roller 120 toward the drive element 110. In some embodiments, one or more of the rollers 122 contacts the drive element 100 when the drive assembly 100 is in a disengaged state. In some embodiments, one or more of the rollers 122 do not contact the drive element 110 when the drive assembly 100 is in a disengaged state.

Referring to FIG. 5, the drive element 110 and the idler elements 120 in the disengaged positions are shown as solid circles. When the drive assembly 100 is in the disengaged state, the rollers 122 are isolated from the wheel 40. The aircraft is able to taxi under engine power or in conjunction with a tug so that rotation of the wheels 40 does not rotate the components of the drive assembly 100. As a result, the drive assembly 100 does not resist rotation of the wheels 40. This isolation also prevents unnecessary wear on the drive assembly 100 components.

To utilize the autonomous taxiing capabilities of the disclosed landing gear system 20, drive assembly 100 is engaged. To move the drive assembly 100 to the engaged state, the diameter of the drive element 110 is increased. The increased diameter of the drive element 110 moves the idler elements 120 (both shown as solid circles in FIG. 5) into contact with the drive surface 46 of the wheel 40 so that the idler elements are compressed between drive element and the drive surface. The frictional contact between the drive element 110 and the idler elements 120 transfers rotation of the drive element to the idler elements. Similarly, frictional contact between the rotating idler elements 120 and the drive surface 46 transfers rotation of the idler elements to the drive surface and, therefore, the wheel 40.

When the drive assembly 100 is in the engaged state, the drive assembly acts as a planetary gear assembly that converts the high-speed/low-torque input from the drive shaft 80 into a low-speed/high-torque output that applied to at least one wheel 40 of the landing gear system 20. In this regard, the drive element 110 acts as the sun gear of a known planetary gear assembly, the idler elements 120 act as planet gears, and the rim 44 of the wheel 40 acts as the ring gear, i.e., the ring gear is integral with the wheel.

Figure 6:
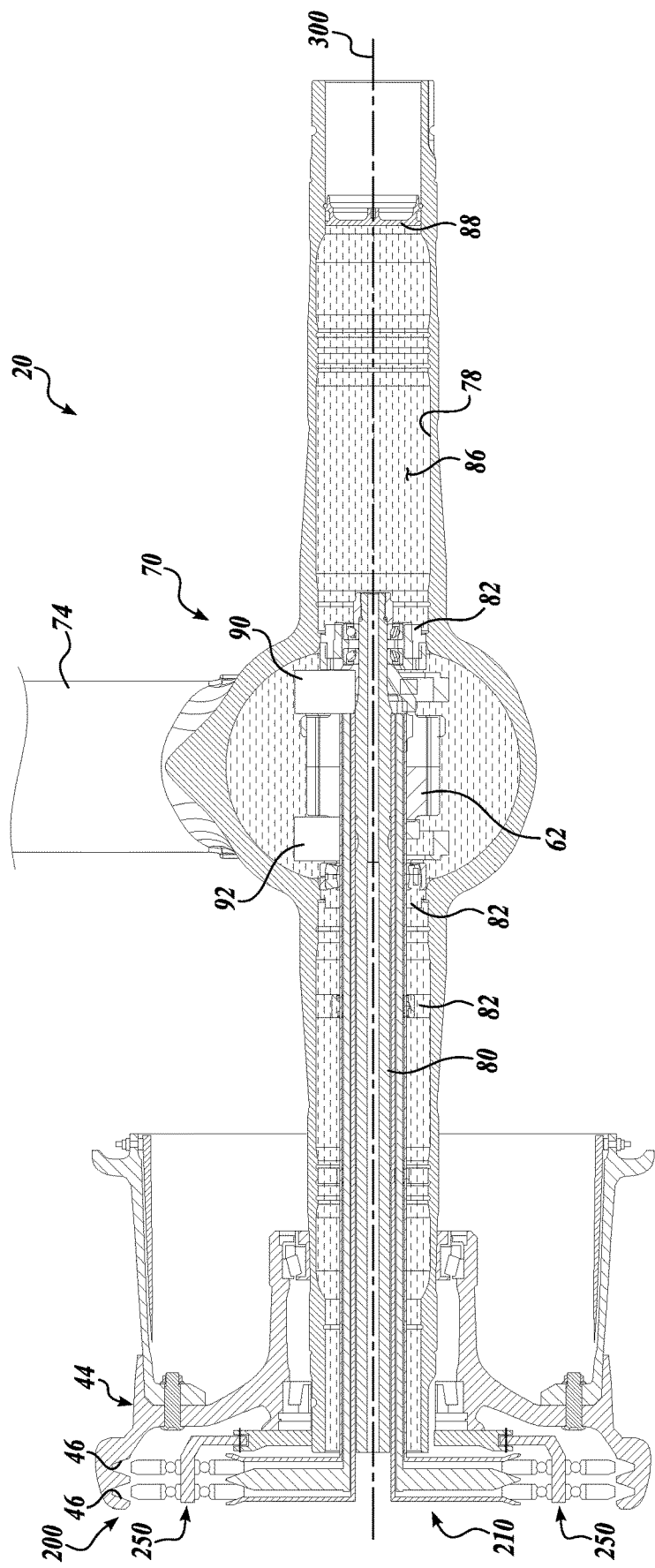
FIG. 6 shows a partial cross-sectional view of a landing gear system for an autonomous taxiing aircraft according to a second representative embodiment of the present disclosure.
Figure 7:
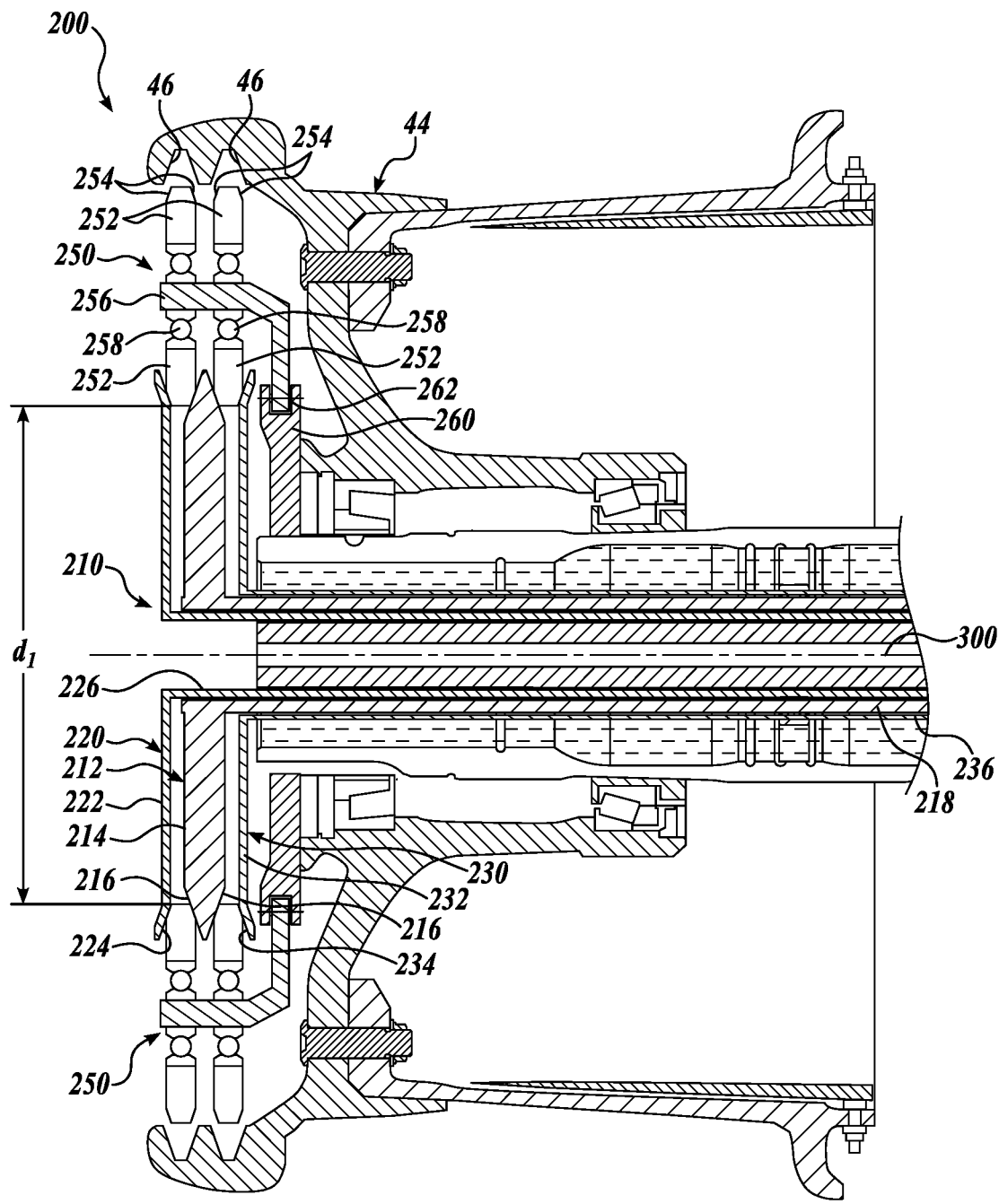
FIG. 7 shows a partial cross-sectional view of a drive assembly of the landing gear system of FIG. 6, wherein the drive assembly is in a disengaged state.
Figure 8:
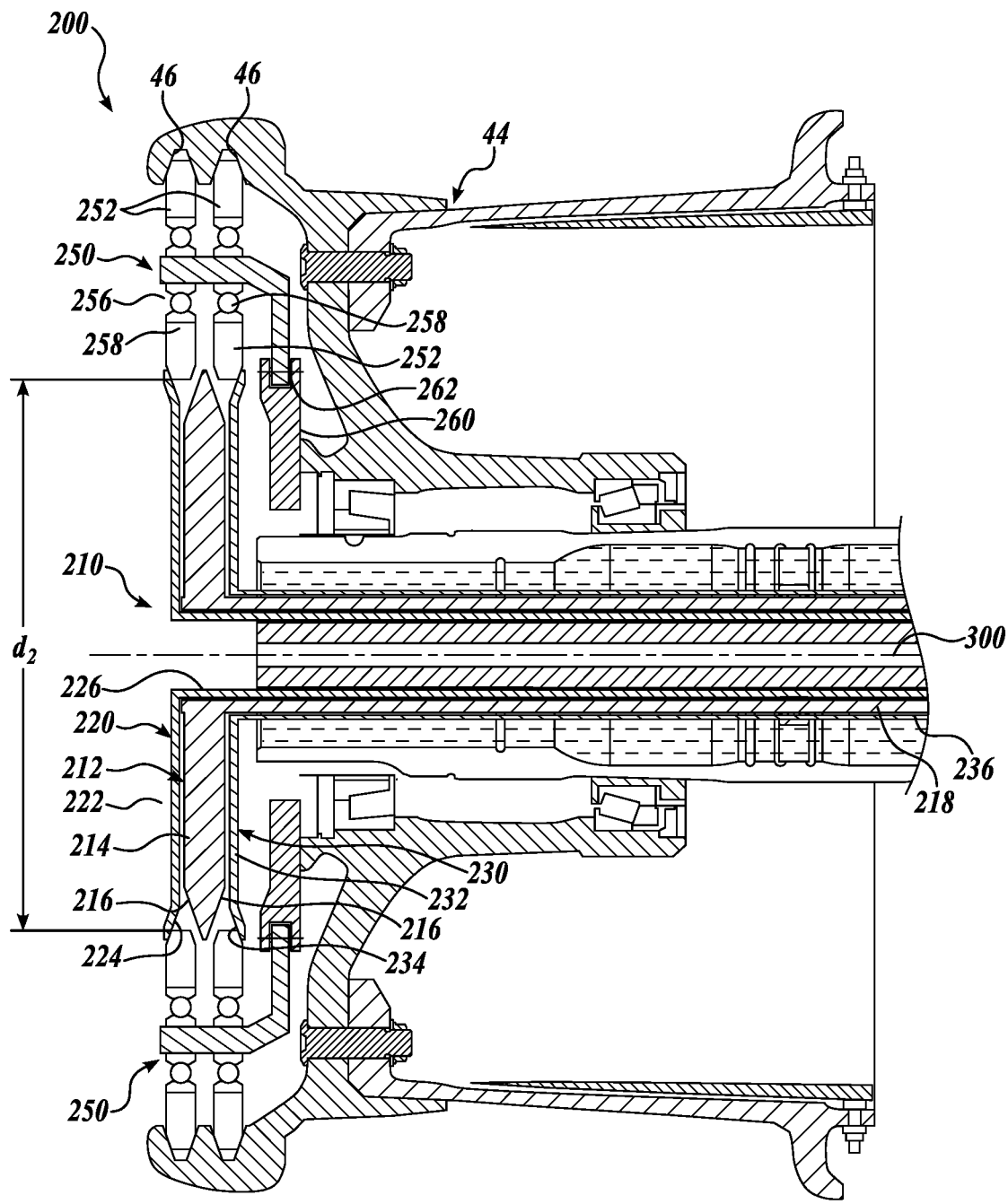
FIG. 8 shows a partial cross-sectional view of a drive assembly of the landing gear system of FIG. 6, wherein the drive assembly is in an engaged state.

Referring now to FIGS. 6-8, another representative embodiment of landing gear system 20 according to the present disclosure is shown. The landing gear system 20 is similar to the previously described landing gear system shown in FIGS. 1-5. In this regard, the landing gear system includes an axle assembly 70 with a motor 50 that rotates a drive shaft 80 to power a drive assembly 200. The drive assembly 200 includes variable-diameter drive element 210 and one or more idler elements 250 configured to convert high-speed/low-torque rotational input from the drive shaft 80 into low-speed/high-torque output to drive the one or more wheels 40 of the landing gear system 20. For the sake of brevity, the embodiment of FIGS. 6-8 will be described with the understanding that the landing gear 20 components are similar to those of the previously described landing gear unless otherwise noted.

As best shown in FIGS. 7 and 8, the illustrated drive element 210 is similar to known double-groove variable pitch pulleys (sheaves). The drive element 210 includes a fixed flange 212 having a disk 214 extending radially from an end of a shaft 218. Each side of the outer edge of the disk 214 is chamfered, i.e., includes a tapered surface 216. The shaft 218 is configured to rotate about axis 300 with the drive shaft 80 and is fixed in translation along axis 300.

An outboard flange 220 includes a disk 222 positioned proximate to the outboard side of the disk 214 of the fixed flange 212. The disk 222 includes an angled surface 224 that cooperates with the outboard tapered surface 216 of the fixed flange 212 to define a V-shaped groove. The disk 222 is mounted to a shaft 226 that is coaxially nested within the shaft 218 of the fixed flange 212. The shaft 226 of the outboard flange is keyed to the shaft 218 of the fixed flange 212 so that the outboard flange 220 is fixed in rotation relative to the fixed flange 212 about axis 300. The outboard flange 220 is also translatable along axis 300 relative to the fixed flange 212. An actuator 90 is operable coupled to the outboard flange 220 and is configured to selectively translate the outboard flange along axis 300 to increase and decrease the width of the V-shaped groove.

An inboard flange 230 includes a disk 232 positioned proximate to the inboard side of the disk 214 of the fixed flange 212. The disk 232 includes and angled surface 234 cooperates with the inboard tapered surface 216 of the fixed flange 212 to define a second V-shaped groove. The disk 232 is mounted to a shaft 236 within which the shaft 218 of the fixed flange 212 is coaxially nested. The shaft 226 of the inboard flange is keyed to the shaft 218 of the fixed flange 212 so that the inboard flange 230 is fixed in rotation relative to the fixed flange 212 about axis 300. The inboard flange 230 is also translatable along axis 300 relative to the fixed flange 212. An actuator 92 is operable coupled to the inboard flange 230 configured to selectively translate the inboard flange along axis 300 to increase and decrease the width of the second V-shaped groove to reciprocate between a first effective diameter (d1) and a second effective diameter (d2).

The idler element 250 includes two rollers 252 mounted to an idler support 256 and idler support base 260. Each roller 252 includes tapered surfaces 254 corresponding to the V-shaped grooves in the drive element 210.

The drive surface 46 of the wheel 40 defines a pair of V-shaped grooves sized and configured to receive the tapered roller 252 of the idler element 250.

To utilize the autonomous taxiing capabilities of the landing gear system 20 comprising drive assembly 200, the drive assembly 200 is moved from the disengaged state, shown in FIG. 7, to the engaged state, shown in FIG. 8. To move the drive assembly 200 to the engaged state, actuator 90 drives the outboard flange 220 inboard toward the fixed flange 212, and actuator 92 drives the inboard flange 230 outboard toward the fixed flange. Moving the outboard and inboard flanges 220 and 230 toward the fixed flange 212 decreases the width of the V-shaped grooves in the drive element 210, which engage the tapered roller 252 of the idler element 250 to drive the tapered rollers into the V-shaped grooves of the drive surface 46. With the idler elements 250 compressed between drive element 210 and the drive surface 46, the frictional contact between the drive element 210 and the idler elements 250 causes the idler elements 250 to rotate in response to rotation of the drive element 210. Similarly, frictional contact between the rotating idler elements 250 and the drive surface 46 rotates the drive surface 46 and, therefore, the wheel 40.

When the drive assembly 200 is in the disengaged state of FIG. 7, the idler elements 120 are disengaged from the wheel 40. As a result, the drive assembly 200 is effectively isolated from rotation of the wheels during takeoff, landing, aircraft towing, and any other wheel rotation not powered by the drive assembly.

When the drive assembly 200 is in the engaged state of FIG. 8, the drive assembly acts as a planetary gear assembly that converts the high-speed/low-torque input from the drive shaft 80 into a low-speed/high-torque output that applied to at least one wheel 40 of the landing gear system 20. In this regard, the drive element 210 acts as the sun gear of a known planetary gear assembly, the idler elements 120 act as planet gears, and the rim 44 of the wheel 40 acts as the ring gear, i.e., the ring gear is integral with the wheel.

It will be appreciated that the illustrated embodiments of landing gear systems are exemplary only and should not be considered limiting. In some embodiments, the number of rollers 252 mounted to one or more of the idler supports 126 differs from the illustrated embodiments. In some embodiments, the actuators that drive the drive elements to reciprocate between the first and second diameters may be electric actuators, hydraulic actuators, pneumatic actuators, or any other suitable configuration. These and other variations are contemplated and should be considered within the scope of the present disclosure.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A landing gear system, comprising:
   an axle comprising an internal cavity;
   a wheel rotatably coupled to the axle, the wheel comprising a drive surface;
   a drive shaft disposed within the cavity, the drive shaft being rotatable about an axis; and
   a drive assembly having a disengaged state and an engaged state, the drive assembly comprising:
      a drive element coupled to the drive shaft for rotation about the axis, the drive element comprising an engagement feature having a first effective diameter when the drive assembly is in the disengaged state and a second effective diameter when the drive assembly is in the engaged state; and
   an idler element mounted for rotation about a second axis, the idler element being frictionally engaged with the engagement feature of the drive element and with the drive surface to transfer rotation of the drive element to the wheel when the drive assembly is in the engaged state, the idler element being disengaged from the drive surface when the drive assembly is in the disengaged state.

2. The landing gear system of claim 1, wherein the drive surface forms a portion of a rim of the wheel.

3. The landing gear system of claim 1, wherein the idler element is rotatably mounted to an idler support, the idler support positioning the idler element in a first position when the drive assembly is in the engaged state and in a second position when the drive assembly is in the disengaged state.

4. The landing gear system of claim 3, wherein the idler support is rotationally mounted to an idler support base, the idler support base being fixedly positioned relative to the axle.

5. The landing gear system of claim 4, wherein the drive assembly further comprises a biasing element engaging the idler support and the idler support base, wherein the biasing element urges the idler element toward the second position.

6. The landing gear system of claim 1, wherein the drive element comprises a variable-diameter roller.

7. The landing gear system of claim 6, wherein the idler element comprises a roller comprising a polymeric material.

8. The landing gear system of claim 6, wherein the idler element comprises a roller having a hardness less than a hardness of the drive element.

9. The landing gear system of claim 1, wherein the drive element comprises a variable-diameter pulley.

10. The landing gear system of claim 9, wherein the engagement feature forms a V-shaped groove with a selectively variable width.

11. The landing gear system of claim 10, wherein the idler element comprises a roller configured to be received by the V-shaped groove.

12. The landing gear system of claim 11, wherein the drive surface forms a V-shaped groove configured to receive the idler element.

13. The landing gear system of claim 9 wherein the variable-diameter pulley comprises a first disk mounted coaxially with a second disc about the axis, the first disk and the second disk defining at least part of the V-shaped groove.

14. The landing gear system of claim 13, wherein the first disk is fixed in translation along the axis relative to the axle, and the second disk is movable in translation along the axis relative to the first disk.

15. The landing gear system of claim 14, further comprising an actuator configured to selectively translate the second disk along the axis.

16. The landing gear system of claim 15, the drive assembly further comprising a third disk mounted coaxially with the first disk, the third disk and the first disk defining at least a part of a second V-shaped groove.

17. The landing gear system of claim 16, wherein the third disk is movable in translation along the axis relative to the first disk.

18. The landing gear system of claim 17, further comprising a second actuator configured to selectively translate the third disk along the axis.

19. The landing gear system of claim 18, the idler element further comprising a second roller rotatably mounted to the idler support.

20. The landing gear system of claim 19, the drive surface further comprising a second V-shaped groove configured to receive the second roller.

* * * * *